United States Patent [19]

Lywood

[11] Patent Number: 5,030,661
[45] Date of Patent: Jul. 9, 1991

[54] HYDROGEN PRODUCTION

[75] Inventor: Warwick J. Lywood, Yarm, England

[73] Assignee: Imperial Chemical Industries PLC, London, England

[21] Appl. No.: 328,010

[22] Filed: Mar. 23, 1989

[30] Foreign Application Priority Data

Mar. 24, 1988 [GB] United Kingdom ............... 8807091
Feb. 9, 1989 [GB] United Kingdom ............... 8902916

[51] Int. Cl.⁵ .................. C01B 3/24; C01B 3/26; C07C 27/06
[52] U.S. Cl. .................. 518/704; 252/373; 423/650; 423/651; 423/652; 518/702
[58] Field of Search ............ 518/704, 702; 252/373; 423/652, 650, 653, 654, 651

[56] References Cited

U.S. PATENT DOCUMENTS

| 4,162,290 | 7/1979 | Crawford et al. | 252/373 |
| 4,337,170 | 6/1982 | Fuderer | 252/373 |
| 4,479,925 | 10/1984 | Shires et al. | 252/376 |
| 4,822,521 | 4/1989 | Fuderer | 252/376 |

FOREIGN PATENT DOCUMENTS 58-79801 5/1983 Japan .

Primary Examiner—Wayne A. Langel
Attorney, Agent, or Firm—Cushman, Darby & Cushman

[57] ABSTRACT

A process for the production of a hydrogen containing gas stream comprises catalytic steam reforming of a major hydrocarbon/steam stream in tubes heated by means of a fired furnace and catalytic steam reforming of a minor hydrocarbon/steam stream in auxiliary tubes heated by the reformed major stream, and mixing the reformed minor stream with the reformed major stream.

10 Claims, 1 Drawing Sheet

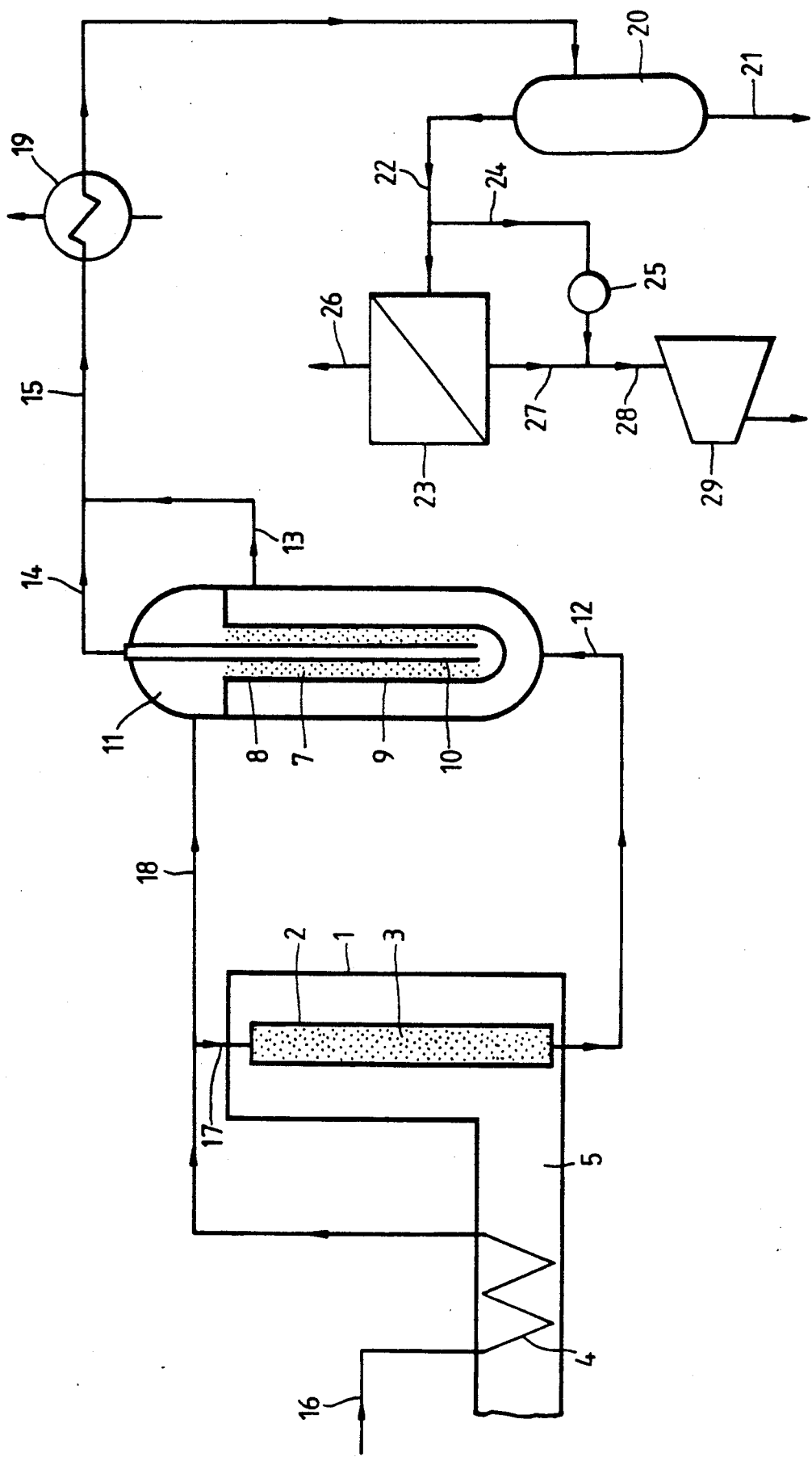

HYDROGEN PRODUCTION

This invention relates to hydrogen and in particular to the production of a gas stream containing hydrogen and carbon oxides, for example methanol synthesis gas, by steam reforming a hydrocarbon feedstock, such as natural gas or naphtha.

The steam reforming process is well known and involves passage of a mixture of the feedstock and steam over a steam reforming catalyst, e.g. nickel, and optionally cobalt, on a suitable support, for example rings of a ceramic such as alpha alumina or calcium aluminate cement. As the reforming reaction is strongly endothermic, heat has to be supplied to the reactant mixture, e.g. by heating the tubes in a furnace. The amount of reforming achieved depends on the temperature of the gas leaving the catalyst: generally an exit temperature in the range 700°–900° C. is employed. Heat can be recovered from the reformed gas leaving the tubes and from the furnace flue gas by heat exchange e.g. producing steam and/or preheating the reactants. However the amount of heat that can thus be recovered is often in an excess of requirements, and so recovered energy often has to be exported, e.g. as steam and/or electricity. As there is not necessarily a need for such exported energy, a more efficient process is often desired.

The amount of heat that need be recovered, for an efficient process, as steam and/or electricity can be reduced by using some of the heat in the reformed gas to supply heat required for reforming of a further amount of feedstock.

Thus, by the provision of auxiliary reformer tubes heated by the reformed gas leaving the reformer tubes heated by a furnace (hereinafter referred to as the furnace reformer tubes), and the provision of a bypass so that part of the feedstock bypasses the furnace reformer tubes and is fed to the auxiliary reformer tubes, heat in the reformed gas stream from the furnace reformer tubes can be utilised to effect reforming of the portion of the feedstock that bypasses the furnace reformer tubes.

This procedure has the effect of reducing the temperature of the reformed gas stream, so that less heat need be recovered therefrom for efficient operation.

A process of this type has been proposed in Japanese kokai 58-079801 using a specially designed reformer wherein the auxiliary reformer tubes are located within the shell of the reformer and are surrounded by the furnace reformer tubes and shielded from the gas heating the furnace reformer tubes by an insulated partition through which the reformed gas from the furnace tubes is passed to heat the auxiliary tubes. In this reformer the reformed gas from the furnace reformer tubes is mixed with the reformed gas produced in the auxiliary reformer tubes prior to utilisation of the reformed gas stream for heating the auxiliary reformer tubes.

By using heat from the reformed gas produced in the furnace reformer tubes to effect heating of the auxiliary tubes, overall more reforming can be effected than if the auxiliary tubes were omitted and so, for a given heat input to the furnace reformer tubes, there is an increase in the amount of hydrogen-containing gas that is produced.

We have devised an advantageous modification of that process. In the present invention the reformed gas produced in the tubes of the auxiliary reformer is only mixed with the reformed gas from the furnace reformer tubes after the latter has been used to heat the auxiliary reformer tubes. The advantage of this, compared to the aforementioned process wherein the reformed gas streams are combined prior to use for heating the auxiliary reformer tubes, is that the heat exchange surface area of the auxiliary tubes heated by the reformed gas stream that is required to effect the same degree of reforming is significantly decreased. This means that fewer, and/or shorter, auxiliary tubes need be employed.

Accordingly the present invention provides a process for the production of a hydrogen containing gas stream comprising:

a) forming major and minor feed streams, each containing hydrocarbon to be reformed together with steam and/or carbon dioxide;

b) forming a reformed major stream by passing the major feed stream over a steam reforming catalyst disposed in furnace reformer tubes heated by combustion of a fuel;

c) passing the reformed major stream past the exterior of auxiliary reformer tubes, thereby supplying heat to said auxiliary reformer tubes and cooling the reformed major stream;

d) forming a reformed minor stream by passing the minor feed stream over a steam reforming catalyst disposed in said auxiliary reformer tubes in a direction counter-current to the flow of the reformed major stream past the exterior of said auxiliary reformer tubes; and then e) mixing the reformed minor stream with the cooled reformed major stream.

In a preferred form of the invention, which is of use for uprating an existing plant, the auxiliary tubes are provided in a separate vessel thus enabling, if desired, a conventional furnace reformer to be employed. Thus an existing plant employing a conventional furnace reformer can be uprated by the addition of an auxiliary reformer containing the auxiliary reformer tubes. Thus in this form of the invention the furnace reformer tubes are disposed within a first, furnace reformer, shell and the reformed major stream is passed out of the first shell and into a second, auxiliary reformer, shell in which the auxiliary reformer tubes are disposed, and past the exterior surface of which the reformed major stream passes.

In a preferred form of the invention, the auxiliary tubes are of the "double tube" configuration, i.e. where each tube comprises an outer tube having a closed end and an inner tube disposed concentrically within the outer tube and communicating with the annular space between the inner and outer tubes at the closed end of the outer tube, with the steam reforming catalyst disposed in said annular space. The minor feed stream is fed to the open ends of the annular catalyst-containing spaces between the inner and outer tubes while the reformed major stream is fed past the external surfaces of the outer tubes. The reformed minor stream leaves the annular spaces at the ends thereof adjacent the closed ends of the outer tubes and flows back through the inner tubes. One form of double-tube reformer is described in EP-A-124226. Another type of double tube reformer is described in EP-A-194067 wherein insulation is provided to minimise the amount of heat transferred through the walls of the inner tube from the reformed minor stream flowing through the inner tube. However in the present invention such insulation should be omitted so that heat transfer takes place through the wall of the inner tube from the reformed minor stream passing through the inner tube to the minor feed stream undergoing reforming in the catalyst-containing annular space. This heat transfer has a dual effect: firstly it supplies part of the heat required for the reforming of the minor feed stream and secondly it gives rise to cooling of the reformed minor stream. The latter has the advantage that the resultant product stream consisting of the mixture of the reformed major and minor streams will be at a lower temperature and hence will contain less heat, thereby reducing the heat recovery necessary therefrom for efficient operation.

The use of this type of reformer wherein a process gas stream, i.e. the reformed major stream, is used to heat the auxiliary reformer tubes has the advantage that the pressure differential across the auxiliary reformer tubes is relatively small, being merely that resulting from the pressure drop the major stream experiences as it passes through the furnace reformer tubes. This means that the auxiliary reformer tubes can be of thinner gauge material than is customary.

In the process of the invention the feedstock, i.e. hydrocarbon to be reformed, is preferably methane or natural gas containing a substantial proportion, e.g. over 90% v/v, methane. If the feedstock contains sulphur compounds, before, or preferably after, compression to the reforming pressure, which is conveniently in the range 10 to 40 bar abs., the feedstock is subjected to desulphurisation, e.g. by passage over a hydrodesulphurisation catalyst followed by absorption of hydrogen sulphide using a suitable absorbent, e.g. a zinc oxide bed. Usually it is desirable to incorporate a hydrogen-containing gas into the feedstock prior to hydrodesulphurisation: this may be achieved by recycling a small amount of the reformed gas, or a hydrogen-containing gas produced therefrom, e.g. a purge gas from a downstream operation e.g. methanol synthesis, to the feedstock prior to passage over the hydrodesulphurisation catalyst.

Prior to reforming, steam is mixed with the feedstock: this steam introduction may be effected by direct injection of steam and/or by saturation of the feedstock by contact of the latter with a stream of heated water. The amount of steam introduced is preferably such as to give 2 to 4 moles of steam per gram atom of carbon in the feedstock. Some or all of the steam may be replaced by carbon dioxide where a supply thereof is available.

The feedstock/steam mixture is preferably preheated by heat exchange with, for example, the combined reformed gas and/or the flue gases of the furnace reformer and then part thereof is fed as the major feed stream to the furnace reformer tubes. The major and minor feed streams may be preheated separately, e.g. to different temperatures and/or may contain differing proportions of steam and/or carbon dioxide. For example steam may be introduced separately into the feedstock streams of the major and minor feed streams. As will be described hereinafter, the feedstocks of the major and minor feed streams may differ. The major feed stream preferably contains 75-90% of the total amount of feedstock in the major and minor feed streams. The furnace reformer is preferably operated so that the temperature of the reformed major stream leaving the catalyst of the furnace reformer tubes in the range 750° to 950° C., especially 850 to 900° C.

The proportion of feedstock that can be reformed in the auxiliary reformer tubes will depend on the acceptable methane content, and the desired temperature, of the reformed product. Thus the methane content of the reformed product will be the sum of the methane contents of the reformed major and minor streams: for any given reformer, feedstock, pressure, and proportion of steam, the methane content of the reformed major stream will depend on the temperature of the reformed major stream leaving the catalyst in the furnace reformer tubes while the methane content of the reformed minor stream will depend on the temperature of the reformed minor stream leaving the catalyst of the auxiliary reformer tubes. The temperature of the reformed minor stream leaving the catalyst of the auxiliary reformer tubes will depend on the temperature of the reformed major stream used to heat the auxiliary reformer tubes, the amount of heat transferred from the reformed minor stream to the minor feed stream undergoing reforming, and the relative proportions of the major and minor feed streams. It is preferred that the reformers are operated so that the methane content of the combined reformed streams is in the range 2 to 10% by volume on a dry basis.

After reforming, the combined reformed gas stream is cooled to below the dew-point of steam therein to condense unreacted steam as water, which is then separated. This cooling may be effected in conventional manner, e.g. by indirect heat exchange with reactants to be fed to the tubes of the fired reformer and/or auxiliary reformer, with water, giving hot water and/or steam (which may be used as process steam), and/or with steam giving super-heated steam from which power may be recovered in a turbine. Alternatively, or additionally, at least the final part of the cooling may be by direct heat exchange with water, giving a warm water stream, containing also the condensed water, which may be used, after further heating, as a hot water stream that is contacted with the feedstock to effect saturation thereof to introduce the process steam.

The process of the invention is of particular utility in the production of methanol synthesis gas. For metallurgical and efficiency reasons, the pressure at which the reforming stage is conducted is generally in the range 10 to 40 bar abs. However, methanol synthesis is normally conducted at higher pressures, e.g. 50 to 120 bar abs. or even higher in old processes, and so, after removing unreacted steam but prior to use for methanol synthesis, the synthesis gas has generally to be compressed. Increasing the throughput of the reforming stage by the process of the invention thus increases the amount of gas that has to be compressed. Not only does this mean that more power is required to effect the compression, but if an existing plant is being modified, the existing synthesis gas compressor may be inadequate to handle the increased amount of synthesis gas.

However, particularly where the feedstock is predominantly methane, e.g. where the feedstock is natural gas, the synthesis gas contains an excess of hydrogen over that required for methanol synthesis. In methanol synthesis gas having stoichiometric proportions of hydrogen and carbon oxides, the ratio (R) of the molar amount of hydrogen (less the molar amount of carbon dioxide) to the total molar amount of carbon oxides equals 2. Typically by the aforesaid process, the ratio R of the synthesis gas is of the order of 2.5 or more, e.g. about 3.

It has been proposed in GB-A-2140801 to produce methanol synthesis gas by a process involving partial oxidation of a hydrocarbon feedstock with air, followed by subjecting the resultant gas stream to the shift reaction and then membrane separation to remove most of the nitrogen introduced by the use of air in the partial oxidation step.

We have realised that by the use of a membrane separation technique it is possible to remove most, or all, of the excess of hydrogen from the combined reformed gas prior to compression to the synthesis pressure. This renders it possible to operate the process of the present invention such that the volume of synthesis gas fed to the compressor is similar to, or even less than, the amount that would be produced if the auxiliary reformer had not been used.

After separation of the unreacted steam from the combined reformed gas streams as water, at least part of the resultant water-depleted stream may thus be subjected to a membrane separation process to separate a permeate stream containing hydrogen from an impermeate stream containing hydrogen and carbon oxides. As is well known in the art, a variety of membrane materials may be used: examples of such membrane materials include polyimides and polyethersulphones. It is preferred to employ a membrane that has a relatively low permeability to carbon oxides so that little thereof pass into the permeate stream: for this reason polyimide membranes are preferred.

It is not necessary that all the water-depleted gas is subjected to the membrane separation: thus part thereof may bypass the membrane separation stage. By varying the proportion bypassing the membrane separation stage, control may be effected on the composition of the synthesis gas. The amount of hydrogen separated and removed as the permeate is preferably such that the synthesis gas formed from the impermeate and that part, if any, of the water-depleted gas bypassing the membrane separation stage has a R ratio, as hereinbefore defined, in the range 1.8 to 2.5, and is preferably such that the volume of the synthesis gas produced that has to be compressed is not more than 10% greater than the dry gas volume of the reformed major stream. In particular it is preferred that the amount of hydrogen removed as the permeate stream is such that the volume of synthesis gas, prior to compression, is no greater than the dry gas volume of the reformed major stream, so that no additional load is placed upon the synthesis gas compressor.

The permeate stream may be used as fuel for heating the furnace reformer tubes or exported to a user of hydrogen.

One form of the invention is illustrated by reference to the accompanying drawing which is a diagrammatic flowsheet wherein for simplicity the reformers are shown with only single catalyst tube in each reformer: in practice there will of course generally be a multiplicity of tubes in each reformer.

In the drawing is shown a furnace shell 1 containing a furnace reformer tube 2 in which a steam reforming catalyst 3 is disposed. Tube 2 is heated by combustion of a fuel within shell 1. A heat exchanger 4 is disposed in the flue gas duct 5 of the furnace shell 1. An auxiliary reformer shell 6 is provided and has disposed therein an auxiliary reformer tube of the "double tube" construction having the catalyst 7 disposed in the annulus 8 between an outer tube 9 and an inner tube 10. Outer tube 9 is closed at its lower end, while the upper end of the outer tube 9 opens into a plenum chamber 11 in the upper end of shell 6. At the lower end of shell 6, a hot gas inlet 12 is disposed, connected to the outlet of the furnace reformer tube 2 of the furnace reformer. The shell 6 is also provided with an outlet 13 for the gas from the space outside the outer tube 9 and an outlet 14 with which the inner tube 10 communicates. Outlets 13 and 14 lead to a reformed gas line 15. A feedstock/steam feed 16 leads to the heat exchanger 4 and a preheated reactants line 17 leads from heat exchanger 4 to the inlet of furnace reformer tube 2. An auxiliary reformer feed 18 is taken from heat exchanger 4 to the plenum chamber 11 of the auxiliary reformer shell 6. The reformed gas line 15 leads, via one or more heat exchangers 19, to a catchpot 20 having a drain 21. A water-depleted gas line 22 leads from catchpot 20 to a membrane separation unit 23 provided with a bypass 24 having a flow control valve 25. Membrane separation unit 23 has a permeate line 26 and an impermeate line 27, to which bypass 24 connects, forming a synthesis gas delivery line 28 feeding to a synthesis gas compressor 29.

In a typical operation a feedstock/steam mixture at a pressure of about 24 bar abs. is preheated in heat exchanger 4 and a major part of the preheated reactants mixture is then fed, via line 17, as the major feed stream to the furnace reformer tubes 2, while the remainder of the preheated mixture is fed via line 18 as the minor feed stream to plenum chamber 11. The major feed stream passes over the catalyst 3 and is reformed by heat supplied by combustion of fuel within furnace shell 1 giving a reformed major stream which is then fed from tubes 2 out through furnace shell 1 and, via inlet 12, to the space within auxiliary reformer shell 6 outside the outer tubes 9, and then via outlet 13 to the reformed gas line 15. The minor feed stream is fed, from plenum chamber 11, over the catalyst 7 in the annuli 8 between tubes 9 and 10 wherein it is reformed. The reformed minor stream leaves the lower end of the annuli and then passes up through the inner tubes 10 to outlet 14 and thence to reformed gas line 15. The heat required for the reforming of the minor feed stream is supplied from the reformed major stream passing past the outside of outer tubes 9 and from the reformed minor stream passing up through the inner tubes 10.

From reformed gas line 15, the combined reformed gas stream is cooled in heat exchanger 19 to below the dew point of the steam therein to condense the unreacted steam as water. The condensed water is separated in catchpot 20 from which it is removed via drain 21. The resultant water-depleted gas is fed, via line 22, to the membrane separation unit 23 and therein separated into a permeate stream 26 and an impermeate stream 27. Part of the water-depleted gas may bypass membrane separation unit via bypass 24. The amount bypassing the membrane unit is controlled by valve 25.

In a typical calculated example using a feedstock of desulphurised natural gas, the gas composition, flow rates, and temperatures at various stages of the reforming operation are as shown in the following table:

| Position | Temp (°C.) | Gas flow rate (kg mol. h$^{-1}$) | | | | |
|---|---|---|---|---|---|---|
| | | CH$_4$ | H$_2$ | CO | CO$_2$ | H$_2$O |
| 17 | 520 | 83.4$^a$ | 2.0 | 0.0 | 0.3 | 250.1 |
| 18 | 520 | 25.1$^b$ | 0.6 | 0.0 | 0.1 | 75.2 |
| 12 | 870 | 14.8 | 228.6 | 44.4 | 24.5 | 157.3 |
| 13 | 664 | 14.8 | 228.6 | 44.4 | 24.5 | 157.3 |
| 10* | 770 | 10.4 | 51.6 | 6.8 | 8.0 | 52.6 |
| 14 | 658 | 10.4 | 51.6 | 6.8 | 8.0 | 52.6 |

-continued

| Position | Temp (°C.) | Gas flow rate (kg mol. h$^{-1}$) | | | | |
|---|---|---|---|---|---|---|
| | | CH$_4$ | H$_2$ | CO | CO$_2$ | H$_2$O |
| 15 | 662 | 25.2 | 280.2 | 51.2 | 32.5 | 209.9 |

*Inlet, ie bottom.
$a, b$ includes 6.5 and 2.0 kg mol. h$^{-1}$, respectively, of higher hydrocarbons expressed as CH$_{2.96}$ In order to achieve the heat transfer across the outer walls of the outer tubes 9 necessary to effect the degree of reforming of the minor feed stream shown in the table, it is calculated that, for a given number of tubes of a given diameter, the tubes 9 need to have a length of 7.2 m exposed to the major reformed gas stream 12.

By way of comparison, if the inner tubes 10 were omitted and there were used the same number of outer tubes 9 of the same diameter but with open lower ends so that the reformed minor stream leaving the tubes 9 mixed with the reformed major stream 12 and the resultant mixture used to heat the tubes 9, the temperatures and gas flow rates are calculated to be as set out in the following table.

| Position | Temp (°C.) | Gas flow rate (kg mol. h$^{-1}$) | | | | |
|---|---|---|---|---|---|---|
| | | CH$_4$ | H$_2$ | CO | CO$_2$ | H$_2$O |
| 17 | 520 | 83.4$^a$ | 2.0 | 0.0 | 0.3 | 250.1 |
| 18 | 520 | 25.1$^b$ | 0.6 | 0.0 | 0.1 | 75.2 |
| 12 | 870 | 14.8 | 228.6 | 44.4 | 24.5 | 157.3 |
| 9* | 762 | 10.7 | 50.7 | 6.5 | 8.0 | 52.9 |
| 12 + 9* | 843 | 25.5 | 279.3 | 50.9 | 32.5 | 210.2 |
| 15 | 663 | 25.5 | 279.3 | 50.9 | 32.5 | 210.2 |

*Outlet, ie bottom.
$a, b$ includes 6.5 and 2.0 kg mol. h$^{-1}$, respectively, of higher hydrocarbons expressed as CH$_{2.96}$ In this case in order to achieve the heat transfer across the outer walls of the outer tubes 9 necessary to effect essentially the same degree of reforming of the minor feed stream, with essentially the same inlet gas flows and temperatures and to give a product stream, i.e. stream 15, at essentially the same outlet temperature, it is calculated that, because the gas effecting the heating has a lower temperature and because there is no heating of the minor feed stream undergoing reforming by heat transfer from the reformed minor stream passing up through tubes 10, the heat exchange surface area of the outer walls of the tubes 9 needs to be increased by about 14%, e.g. by increasing the length of tubes 9 exposed to the combined reformed major and minor streams, i.e. stream 12 plus the stream from the outlet of tube 9, from 7.2 m to 8.2 m.

The following table illustrates the formation of an approximately stoichiometric synthesis gas from the combined reformed gas stream 15 in the aforementioned example of the invention (assuming no bypass of the membrane unit). In this example it is assumed that the pressure of the gas fed to the membrane separation unit is about 22 bar abs. and that the permeate has a pressure of about 2 bar abs. It is also assumed that the membrane employed is of the polyimide type having a hydrogen to carbon monoxide permeability ratio of 39, a hydrogen to carbon dioxide permeability ratio of about 5.4, and that the methane permeability is similar to that of carbon monoxide.

| Position | Temp (°C.) | Gas flow rate (kg mol. h$^{-1}$) | | | | |
|---|---|---|---|---|---|---|
| | | CH$_4$ | H$_2$ | CO | CO$_2$ | H$_2$O |
| 15 | 662 | 25.2 | 280.2 | 51.2 | 32.5 | 209.9 |
| 22 | 35 | 25.2 | 280.2 | 51.2 | 32.5 | 1.0 |
| 26 | 35 | 0.3 | 88.7 | 0.6 | 2.5 | 0.5 |
| 27 | 35 | 24.9 | 191.5 | 50.6 | 30.0 | 0.5 |

It is seen that the proportion of feedstock that is fed to the auxiliary reformer is about 23% of the total. Consequently, if the above system is employed to uprate an existing furnace reformer, by the provision of the auxiliary reformer the throughput can be increased by about 25% at the expense of a lower reformed gas temperature and an increase in the methane content of the synthesis gas from 4.7% (if no auxiliary reformer and no membrane separation unit were employed) to 6.5% by volume (on a dry basis).

Since a small proportion of carbon oxides, principally carbon dioxide, are separated into the permeate stream 26, the full benefit of the increase in the reformer throughput is not realisable in terms of the amount of methanol that can be produced: however it is seen that the synthesis gas stream 27 contains about 17% more carbon oxides than the reformed major stream 12 and so the amount of methanol that can be produced may be significantly increased.

Further, it is seen that the amount of synthesis gas produced, i.e. stream 27, is about 95% of the amount of dry gas in the reformed major stream 12. Thus not only is the reformer throughput, and hence amount of methanol that can be produced, increased significantly, but also the amount of gas fed to the compressor is slightly reduced, resulting in a power saving.

It has been the practice to take a purge stream from the methanol synthesis loop and to use this purge as fuel for the furnace reformer. Such a purge has been necessary to avoid a build-up in the loop of inerts, e.g. methane, and possibly nitrogen (which may be present in small amounts in natural gas), and the excess of hydrogen resulting from the use of a hydrogen-rich synthesis gas. By means of the present invention it is possible to recycle some or all of the methane-containing purge to the reforming stage as the membrane unit acts to remove some or all of the excess of hydrogen. If the membrane employed is such as to separate nitrogen into the permeate stream, then in some cases it may be possible to recycle all of the purge. That portion, if any, of the purge that is not recycled may be used as fuel for the fired reformer, together with the hydrogen-rich permeate stream from the membrane unit as aforesaid. The recycled purge forms part of the feedstock to the reformer, thus decreasing the amount of fresh feedstock required. Furthermore, since the recycled purge contains hydrogen, it may be used as the hydrogen-containing gas added to the fresh feedstock prior to hydrodesulphurisation of the latter.

Part or all of the recycled purge may be subjected to a further membrane separation step to separate hydrogen as a hydrogen-containing permeate stream. The impermeate stream is then recycled to form part of the feedstock. This has the advantage of reducing the amount of hydrogen that is recycled and so decreases the load on the membrane separation unit treating the water-depleted gas. The hydrogen-containing permeate stream may be used as part of the fuel for the furnace reformer. Where there is a need to recycle part of the purge as a hydrogen-containing gas, e.g. for hydrodesulphurisation, the part to be used for hydrodesulphurisation is desirably not subjected to such a membrane separation step.

In some cases it may be desirable that the major and minor feed streams fed to the reformers contain different proportions of the recycled purge. For example, the major feed stream may contain only a small proportion of the recycled purge, e.g. merely that required to supply the amount of hydrogen required to ensure satisfactory hydrodesulphurisation, while the remainder is used as feedstock in the minor feed stream. Indeed, in some cases the feedstock of the minor feed stream may consist entirely of recycled purge, preferably after subjecting that purge to a membrane separation step.

I claim:

1. A process for the production of a hydrogen containing gas stream comprising:
    a) forming major and minor feed streams, each containing hydrocarbon to be reformed together with at least one gas selected from steam and carbon dioxide;
    b) forming a reformed major stream by passing the major feed stream over a steam reforming catalyst disposed in furnace reformer tubes heated by combustion of a fuel;
    c) passing the reformed major stream past the exterior of auxiliary reformer tubes, thereby supplying heat to said auxiliary reformer tubes and cooling the reformed major stream;
    d) forming a reformed minor stream by passing the minor feed stream over a steam reforming catalyst disposed in said auxiliary reformer tubes in a direction counter-current to the flow of the reformed major stream past the exterior of said auxiliary reformer tubes; and then
    e) mixing the reformed minor stream with the cooled reformed major stream.

2. A process according to claim 1 wherein the furnace reformer tubes are disposed within a first shell and the reformed major stream is passed out of said first shell, passed into a second shell in which the auxiliary reformer tubes are disposed, and past the exterior surface of said auxiliary reformer tubes to effect the heating thereof.

3. A process according to claim 1 wherein:
    i) each of the auxiliary reformer tubes comprises an outer tube having a closed end and an inner tube disposed concentrically within the outer tube and communicating with the annular spade between the inner and outer tubes at the closed end of the outer tube and the steam reforming catalyst is disposed in said annular space;
    ii) the minor feed stream is fed to the open ends of the annular catalyst-containing spaces between the inner and outer tubes;
    iii) the reformed major stream is fed past the external surfaces of the outer tubes in a direction counter-current to the flow of the minor feed stream through said annular catalyst-containing spaces; and
    iv) the reformed minor stream leaves the annular spaces at the ends thereof adjacent the closed ends of the outer tubes and flows back through the inner tubes, whereby heat transfer takes place between the reformed minor stream passing through said inner tubes and the minor feed stream passing through the annular catalyst-containing spaces.

4. A process according to claim 1 wherein the major feed stream contains 75-90% of the total amount of hydrocarbon in the major and minor feed streams.

5. A process according to claim 1 wherein the combined reformed streams is cooled, unreacted steam is condensed and separated as water, and the resultant water-depleted stream forms a methanol synthesis gas stream that is then compressed and methanol is synthesised therefrom.

6. A process according to claim 5 wherein, prior to compression, a hydrogen-containing stream is separated from at least part of the water-depleted stream, the amount of hydrogen that is separated being such that the methanol synthesis gas stream has a ratio (R) in the range 1.8 to 2.5 where R is the ratio of the molar amount of hydrogen (less the molar amount of carbon dioxide) to the total molar amount of carbon oxides.

7. A process according to claim 6 wherein the amount of hydrogen separated is such that the volume of the methanol synthesis gas stream, prior to compression, is not more than 10% greater than the dry gas volume of the reformed major stream.

8. A process according to claim 6 wherein the separated hydrogen is used as fuel for heating the furnace reformer tubes, the methanol synthesis is effected in a synthesis loop from which a methane-containing purge stream is taken, and at least part of this purge stream is recycled to form part of the total feedstock of the major and minor feed streams.

9. A process according to claim 8 wherein at least part of the purge stream is subjected to a membrane separation step to separate a permeate stream containing hydrogen and a methane-containing impermeate stream which is used as part of the total feedstock of the major and minor feed streams.

10. A process according to claim 8 wherein the hydrocarbon of the minor feed stream consists entirely of methane from said recycled purge stream.

* * * * *